United States Patent Office 3,586,545
Patented June 22, 1971

3,586,545
METHOD OF MAKING THIN-GAUGE ORIENTED ELECTRICAL STEEL SHEET
Edward B. Stanley, Washington Township, Westmoreland County, Pa., assignor to United States Steel Corporation
No Drawing. Filed Apr. 23, 1969, Ser. No. 818,816
Int. Cl. H01f 1/16
U.S. Cl. 148—111                      8 Claims

ABSTRACT OF THE DISCLOSURE

A method of producing cube-on-edge oriented silicon-iron sheet stock 0.005 to 0.010 inch thick utilizing a triple cold reduction of the silicon-iron hot band wherein each cold reduction is followed by annealing and the product is finally box annealed to effect the grain orientation. Either the second or third anneal must be a decarburizing anneal, and there must be about a 50 percent thickness reduction during the first and third cold reduction.

BACKGROUND OF THE INVENTION

This invention relates generally to grain-oriented silicon-iron sheet stock. More specifically, this invention relates to a method of more consistently producing cube-on-edge oriented silicon-iron sheet stock 0.005 to 0.010 inch thick having low core losses and high magnetic permeability, especially at high inductions of 15,000 gausses or higher.

Grain oriented silicon-iron sheet stock for use in transformers, amplifiers, impulse and memory storing devices and the like must meet certain minimum requirements if equipment quality and cost objectives are to be attained. Of prime concern, of course, is the degree or extent of grain orientation since the desired directional magnetic properties are directly related thereto. That is, higher degrees of grain orientation will result in higher magnetic permeability and lower core loss. In addition, the use of thinner sheets in laminated cores will further contribute to a reduction in core losses, since the flow of stray magnetic fields is restricted, reducing eddy-current losses, and thus total core losses.

Cube-on-edge (110) [001] oriented silicon-iron sheet stock for use in transformers operating at high inductions and at frequency of about 60 hertz has been limited to minimum thicknesses of about 0.010 inch due to the inability of prior art stock manufacturing methods to consistently produce thinner gauge stock having suitable magnetic properties. Specifically, the high degree of grain orientation as required to provide the necessary high magnetic permeability and low core losses can consistently be obtained only in sheets rolled to thicknesses of from about 0.010 to 0.014 inch. Therefore, the objectives of the transformer industry would be better facilitated if there were available thinner sheet stock, i.e. less than 0.010 inch, having the better magnetic properties.

Formation of the cube-on-edge orientation readily occurs in 0.010 to 0.014 inch silicon-iron stock in the course of secondary recrystallization stage during a final high temperature anneal after successive cold reductions and intermediate anneals. An example of such a process is described in Goss, U.S. Pat. No. 1,965,559. Attempts to utilize such prior art processes to produce thinner gauge silicon-iron stock with a high degree of cube-on-edge orientation or exceptionally good magnetic properties have not been successful.

Processes have been developed for manufacturing thin sheet less than 0.010 inch having cube-on-edge orientation for high frequency applications. One such process involves the further cold rolling of already formed oriented stock of 0.014 inch or thicker. According to another more recent process, it is maintained that good orientations cannot be obtained in sheets less than 0.008 inch thick unless grain growth inhibitors such as sulfur or selenium are diffused into the sheet prior to or during the orientation anneal. These inhibitors must then be removed during the final anneal by suitable desulfurizing deselenizing conditions. Although these processes are successful in producing cube-on-edge oriented sheet at thicknesses less than 0.010 inch, orientations above about 85% may be difficult to produce consistently. Hence, the typical magnetic properties of these prior art thinner sheets are usually inferior or not much better than those of the thicker sheets. The present state of the art therefore is that oriented sheet can be produced at thicknesses of less than 0.010 inch, but the magnetic properties, especially permeability, are not improved proportionally with the reduction in thickness.

Accordingly, the industry could well use a cube-on-edge grain oriented silicon-iron sheet 0.005 to 0.010 inch thick consistently having orientations in excess of 85% and magnetic properties vastly superior to those of the commercially available thicker stock.

SUMMARY OF THE INVENTION

It is a primary object of the present invention to provide new and improved processes for the production of thin, i.e. under about 0.010 inch, silicon-iron sheet stock having at least about a 90% orientation and having a core loss below 0.50 watt per pound at an induction of 15 kilogausses (kg.) at 60 cycles, a permeability at the latter induction, in excess of 20,000, and a permeability at 10 oersteds in excess of 1800.

It is another primary object of this invention to provide a process of sequential cold reduction and annealing steps whereby silicon-iron sheet can be produced having a high degree of cube-on-edge orientation at thicknesses of from 0.005 to 0.010 inch.

It is a further primary object of this invention to provide a series of cold rolling and annealing steps wherein the annealing environments are chosen, in regard to composition and temperatures, so as to produce a greater extent of cube-on-edge orientation in 0.005 to 0.010 inch gauge silicon-iron sheet stock than has heretofore been possible in such processes.

It is yet another primary object of this invention to provide a process for producing cube-on-edge oriented silicon-iron sheet at thicknesses of from 0.005 to 0.010 inch wherein grain growth inhibitors are not removed, so that lower final annealing temperatures can be used and a refractory parting material eliminated.

It is still a further primary object of this invention to provide silicon-iron sheet stock of a thickness from about 0.005 to about 0.010 inch and having a cube-on-edge orientation and desirable magnetic properties greater than heretofore provided.

DESCRIPTION OF THE PREFERRED EMBODIMENTS

As in other processes for the production of cube-on-edge grain oriented silicon-iron sheet stock, the starting material used in the process of this invention is the conventional intermediate silicon steel hot rolled to about 0.070 to 0.090 inch. These intermediate silicon steels contain from 2.5 to 3.5% silicon with a content of about 3.15% being most typical. It has been the practice in the industry to carefully control melting and refining of these steels so as to insure a clean high purity steel. Composition objectives other than silicon are usually as follows: carbon 0.015 to 0.030%, sulfur 0.012 to 0.028% phosphorus less than 0.015%, manganese 0.6 to 0.15%. The alloy is cast and rolled to slags by conventional mill techniques. The slabs are hot rolled to about 0.080 inch and coiled in continuous hot strip mills. Before any cold rolling is effected, the hot rolled coils must be pickled generally in sulfuric acid solution to remove any mill scale.

This invention is characterized by subjecting the cleaned hot band to three separate and controlled cold reductions, each followed by controlled annealing. The extent of first and third cold reduction, being ideally at about 50% each, is critical for the proper texture development. As in prior art practices, the cold reduction is of course most easily effected on conventional multistand cold rolling mills.

In a preferred embodiment of this invention, the cleaned hot band, as noted above, is first cold rolled to effect a thickness reduction of only about 50 percent. Specifically, the 0.08 inch hot band is first reduced to a thickness of about 0.04 inch. Although reductions up to about 90 percent could easily be effected, I have learned that the proper texture development necessary to yield the high degree of orientation as sought in the final product, can be effected only if the first cold roll is limited to about 50 percent. At any rate, it should be held within a range of from 45 to 55 percent.

In the second cold reduction, the 0.040 inch sheet is further reduced to a specific thickness between 0.014 and 0.010 inch. This amounts to a reduction of from 65 to 76 percent. Although this second cold roll, like the first, must be critically controlled to develop a proper texture, the percentage of reduction per se is not critical. What is critical to the proper texture development, is that the sheet be reduced to a thickness of about twice the intended final thickness. This is because the most critical parameter of this process is that the sheet be reduced by 50 percent during the third and final cold roll. Accordingly, if a final thickness of 0.007 inch is desired, the second cold roll should reduce the sheet to 0.014 inch, so that about a 50 percent reduction can be made in the last cold roll.

After each cold reduction, the sheet must of course be annealed, not only to relieve internal stresses induced by the cold working, but more importantly to effect a fine grained primary recrystallization structure and texture which are essential to proper secondary recrystallization structure development in the final anneal.

The annealing procedures I have used are substantially those taught or suggested by the prior art. That is, either of the conventional continuous or open-coil batch annealing processes will suffice. Although the 0.040 inch sheet after the first cold roll may be too thick for many of the continuous annealing furnaces presently in use, continuous annealing is preferable to batch annealing. Continuous annealing provides a more uniform heating, and allows a faster annealing cycle to minimize exaggerated grain growth. Except as noted below, I therefore prefer a continuous anneal for each of the three annealing processes at a temperature generally within the range 1400–1800° F. in a protective atmosphere. The annealing time must be sufficient to completely effect primary recrystallization. Prolonged heating however should be avoided so that grain growth is minimized. If open coil batch annealing is used, it is advisable to avoid temperatures in excess of 1750° F. so as to eliminate the possibility of interface fusing.

Specifically then, for the first anneal following the first cold reduction, I prefer a continuous anneal at a temperature within the range 1475 to 1800° F., and ideally at 1600° F., in a protective non-oxidizing atmosphere for a period of from 2 to 5 minutes. As noted above, an open coil batch anneal may be substituted, ideally again at a temperature of about 1600° F., but not exceeding 1750° F.

The second anneal, following the second cold reduction, is to some extent a little more critical than the first anneal. Here, optimum results are not easily achieved with an open coil batch anneal, and therefore a continuous anneal is preferred. Another more limiting factor is that of annealing time which should be restricted to 2 to 3 minutes because the sheet, being thinner, can more quickly be heated to a uniform annealing temperature, again within the range of 1600 to 1800° F. As will be discussed subsequently, this second anneal may be a decarburizing anneal.

The third anneal, following the third and last cold reduction is again preferably a continuous anneal, but is substantially different in that it should be a decarburizing anneal. In addition to stress relief and primary recrystallization, this anneal should serve to reduce the carbon content of the sheet to levels of 0.002 percent or less. Here again the annealing temperature is preferably at about 1475° F. Reasonably good results, however, can be obtained by effecting this third anneal at any temperature of from 1400 to 1600° F. in a moist hydrogen containing atmosphere substantially as taught by Carpenter in U.S. Pat. No. 2,287,467. The holding time should of course be sufficient to effect the desired decarburization, which should be at least 60 seconds. For optimum results, I prefer to anneal at a temperature of about 1475° F. for a period of about 100 seconds and in a moist atmosphere containing a mixture of hydrogen and nitrogen, having a dew point of +70 F.

There is some recognition in the art that carbon, although detrimental to the desired magnetic properties of the finish product, is beneficial during the primary recrystallization stages because it inhibits grain growth. I have learned, however, that in my process, decarburization is not essential to the last intermediate anneal, but may, with equal results, be performed during the second anneal. Therefore, the second and third anneals described above can be literally interchanged, so that the above described decarburizing anneal may be used as the second anneal, and the non-decarburizing anneal as described for the second anneal may be used as the third anneal. However, I have found that the steel must be given a third primary recrystallization anneal if it is decarburized during the second anneal, otherwise the final properties and orientation will be very poor. In addition, it is more advantageous insofar as magnetic properties are concerned to conduct the decarburizing second anneal at 1600° F.

After the third anneal has effected the primary recrystallization, the sheet is given a final orientation anneal. That is, the sheet is given a box anneal at a temperature of from about 1700 to 2250° F. which causes a secondary recrystallization yielding the desired oriented grains. The annealing time must of course be sufficient to effect complete secondary recrystallization (grain orientation) which may vary from 1 to 8 hours. As expected, annealing time required is inversely proportional to annealing temperature. Hence, higher temperatures will require shorter annealing times.

Prior to the final anneal, however, at least one surface of the sheet should be coated with a refractory parting material, such as magnesium oxide if annealing temperatures in excess of about 1750° F. are to be used. This serves to prevent the contacting surfaces of the sheet from sticking together. Although the use of higher temperatures is encouraged if optimum orientation is desired, a unique feature of this process is found in the fact that temperatures below 2000° F. may be used with almost equal results. That is to say, by avoiding the use of additional grain growth inhibitors such as sulfur, which are added to coatings or annealing atmospheres as taught in some prior art references, a high temperature final anneal is not necessary since desulfurization or removal of other inhibitors is not necessary. Accordingly, if one prefers to avoid the inherent disadvantages of the MgO coating (i.e. it adds thickness to the sheet, and its hard, abrasive nature adversely affects punching and slitting characteristics) he may choose to final anneal at temperatures of about 1750° F. where a parting material such as MgO need not be employed.

Another advantage of this process is that a reducing atmosphere for the removal of sulfur or other grain growth inhibitors need not be employed during the final anneal. Hence, inert non-oxidizing atmospheres such as helium or argon may be used instead of the more hazardous hydrogen atmospheres.

The two tables below are presented to further illustrate the detailed advantages of this invention. Table I contrasts the typical magnetic properties that can be attained by my process with the typical magnetic properties that are attained in two prior art processes, and one experimental triple cold roll process outside the scope of this invention. The magnetic properties compared are those obtained at an induction at 15 kg. and 60 hertz.

TABLE I

| Process | Sample | Core losses at 15 kg. (watts/lb./60) | Permeability at 15 kg. |
|---|---|---|---|
| Typical samples processed to 0.007 inch in accordance with this invention. | 1 | 0.493 | 31,579 |
| | 2 | 0.494 | 30,928 |
| | 3 | 0.496 | 29,412 |
| | 4 | 0.499 | 31,250 |
| | 5 | 0.503 | 31,579 |
| | 6 | 0.482 | 31,579 |
| Typical samples processed to 0.007 inch by prior art process of reducing fully processed 0.014 inch oriented stock. | 7 | 0.80 | 2,973 |
| | 8 | 0.70 | 5,000 |
| | 9 | 0.71 | 4,918 |
| Typical samples processed to 0.007 inch by prior art double cold roll process. | 10 | 1.15 | 557 |
| | 11 | 1.19 | 682 |
| | 12 | 0.99 | 1,442 |
| | 13 | 1.18 | 652 |
| | 14 | 0.94 | 1,948 |
| | 15 | 1.23 | 556 |
| Typical samples processed to 0.007 inch by an experimental triple cold roll process having a final reduction of about 33%. | 16 | 0.61 | 11,029 |
| | 17 | 0.61 | 9,264 |
| | 18 | 0.58 | 10,274 |

From the above table, it is readily seen that the magnetic properties at 15 kg. resulting from following my process are substantially superior to those attainable by the two prior art processes compared therewith. At other induction values the improvement was comparable.

Table II below, illustrates the typical magnetic properties at inductions of 15 and 17 kg. for six samples of 0.007 inch sheet manufactured in accordance with this invention. All six samples were identically cold rolled at 50, 65 and 50% respectively with first two intermediate anneals at 1600° F. and a last continuous anneal at 1475° F. as described above. The only variance was the final annealing time and temperature as noted in the table.

I claim:
1. A method of producing cube-on-edge oriented silicon-iron sheet stock having a thickness of from 0.005 to 0.010 inch from a relatively scale-free silicon-iron hot rolled band, the steps comprising:
(a) reducing the hot rolled band to the desired final stock thickness within the range of from 0.005 to 0.010 inch by subjecting the band to three successive cold reductions, the amount of each the first and third cold reduction being within the range 45 to 55 percent;
(b) annealing the sheet after each cold reduction in a non-oxidizing atmosphere at a temperature within the range 1400 to 1800° F. for a length of time sufficient to effect primary recrystallization, the first anneal being in a non-decarburizing atmosphere and one of the second and third anneals being in a decarburizing atmosphere at a temperature within the range 1400 to 1600° F. for a length of time suffiicent to reduce the carbon content of the sheet to 0.003 percent carbon or less; and
(c) then annealing the sheet in a non-oxidizing atmosphere at a temperature of from 1750 to 2250° F. for a length of time sufficient to develop a secondary recrystallized oriented cube-on-edge grain structure.

2. A method of producing cube-on-edge oriented silicon-iron sheet stock according to claim 1 wherein about a 50 percent eduction is effected in said first and third cold reductions.

3. A method of producing cube-on-edge oriented silicon-iron sheet stock according to claim 1 wherein the annealing process following the first cold reduction is an open coil batch anneal at a temperature within the range 1400 to 1700° F.

4. A method of producing cube-on-edge oriented silicon-iron sheet stock according to claim 1 wherein said second anneal is a decarburizing anneal and said third anneal is a non-decarburizing anneal.

5. A method of producing cube-on-edge oriented silicon-iron sheet stock according to claim 1 wherein said first and second anneals are effected at a temperature of about 1600° F.

6. A method of producing cube-on-edge oriented silicon-iron sheet stock according to claim 1 which includes coating at least one surface of the cold reduced sheet with a refractory parting material after the third anneal, and the final anneal is a box anneal with the parting material on the sheet effected at a temperature of from 2200 to 2250° F.

7. A method of producing cube-on-edge oriented silicon-iron sheet stock according to claim 1 wherein the hot band has a thickness of about 0.08 inch and the TABLE II.—AVERAGE MAGNETIC PROPERTIES AND ORIENTATION, AFTER VARIOUS FINAL HIGH-TEMPERATURE ANNEALS

| | Final annealing conditions | | Number of strips [1] | Core loss, watts/lb./60 at— | | Permeability at— | | | Major magnetic-torque peak [2] |
|---|---|---|---|---|---|---|---|---|---|
| | Temp., °F. | Time, hrs. | | 15 kg. | 17 kg. | 15 kg. | 17 kg. | 10 H. | |
| Sample No.: | | | | | | | | | |
| 1 | 1,750 | 4 | 6 | 0.514 | 0.805 | 21,946 | 6,573 | 1,821 | 177 |
| 2 | 1,750 | 8 | 6 | 0.494 | 0.774 | 22,331 | 6,456 | 1,821 | 177 |
| 3 | 1,950 | 1 | 6 | 0.451 | 0.713 | 26,707 | 8,548 | 1,831 | 175 |
| 4 | 2,000 | 1 | 6 | 0.420 | 0.673 | 28,441 | 9,788 | 1,856 | 187 |
| 5 | 2,150 | 7½ | 32 | 0.462 | 0.713 | 33,708 | 10,241 | 1,856 | 197 |
| 6 | 2,250 | 2½ | 6 | 0.440 | 0.638 | 35,245 | 12,819 | 1,865 | 193 |

[1] 3 cm. wide by 28 cm. long.  [2] Thousands of dyne-cm./cm.³

From Table II above, it will be readily apparent to those skilled in the art that the process of this invention can readily produce cube-on-edge oriented silicon-iron sheet as thin as 0.007 inch having superior magnetic properties not before obtainable in sheets thinner than 0.010 inch.

amount of the three cold reductions are 50 percent, 65 percent and 50 percent respectively so as to yield a sheet having a thickness of about 0.007 inch.

8. A method of producing cube-on-edge oriented silicon-iron sheet stock according to claim 1 wherein the decarburizing anneal is in a moist hydrogen containing atmosphere having a dew point of about +70 F.

References Cited

UNITED STATES PATENTS

| | | | |
|---|---|---|---|
| 1,965,559 | 7/1934 | Goss | 148—111 |
| 2,112,084 | 3/1938 | Frey et al. | 148—111 |
| 2,599,340 | 6/1952 | Littmann et al. | 148—112X |
| 2,867,557 | 1/1959 | Crede et al. | 148—111 |
| 3,165,428 | 1/1965 | Albert et al. | 148—111 |
| 3,271,202 | 9/1966 | Freeman et al. | 148—111X |
| 3,333,993 | 8/1967 | Kohler | 148—113 |

L. DEWAYNE RUTLEDGE, Primary Examiner

G. K. WHITE, Assistant Examiner

148—31.55, 112, 113

UNITED STATES PATENT OFFICE
CERTIFICATE OF CORRECTION

Patent No. 3,586,545        Dated June 22, 1971

Inventor(s) Edward B. Stanley

It is certified that error appears in the above-identified patent and that said Letters Patent are hereby corrected as shown below:

Column 2, line 70, "0.6" should read -- 0.06 --.

Signed and sealed this 2nd day of May 1972.

(SEAL)
Attest:

EDWARD M. FLETCHER, JR.				ROBERT GOTTSCHALK
Attesting Officer				Commissioner of Patents